(No Model.)
J. T. THATCHER.
WATERING TROUGH.
No. 453,894. Patented June 9, 1891.
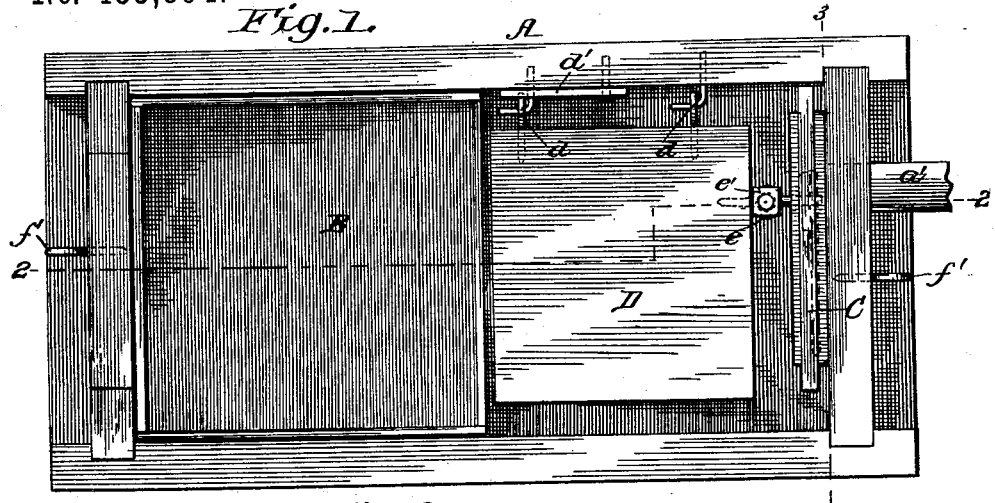
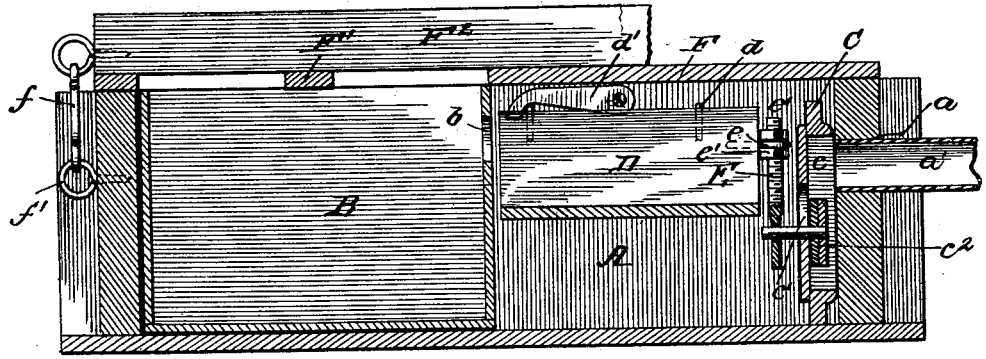
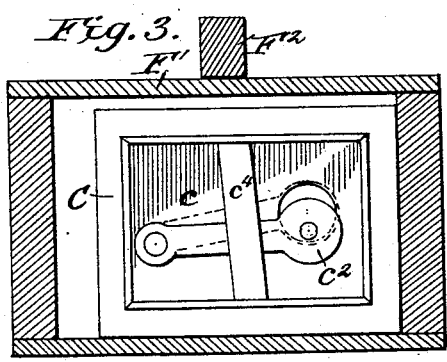
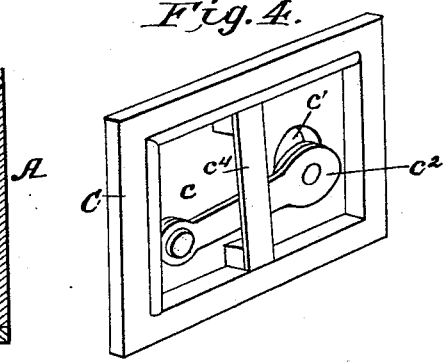
WITNESSES:
Fred G. Dieterich
W. D. Blondel
INVENTOR:
John T. Thatcher
BY Munn & Co
ATTORNEYS.

UNITED STATES PATENT OFFICE.

JOHN THOMAS THATCHER, OF FRANKFORT, INDIANA.

WATERING-TROUGH.

SPECIFICATION forming part of Letters Patent No. 453,894, dated June 9, 1891.

Application filed March 16, 1891. Serial No. 385,291. (No model.)

*To all whom it may concern:*

Be it known that I, JOHN THOMAS THATCHER, of Frankfort, in the county of Clinton and State of Indiana, have invented a new and useful Improvement in Watering-Troughs, of which the following is a specification.

This invention relates to an improved stock-watering trough, and has for its object to provide a device of the character described which shall always be filled to a definite level and automatically shut off and on the water-supply when the water within the tank gets above or below the specified level.

A further object is to construct a device that can be easily cleaned.

With these objects in view my invention consists in the peculiar construction of the several parts and their novel combination or arrangement, all of which will be more fully hereinafter described and claimed.

In the drawings forming a part of this specification, Figure 1 is a top plan view of my improved trough, the cover being removed. Fig. 2 is a longitudinal section on the line 2 2 of Fig. 1. Fig. 3 is a cross-section taken on the line 3 3 of Fig. 1, and Fig. 4 is a detail view of valve.

In the practical embodiment of my invention I employ a trough or receptacle A, of any suitable size, and preferably rectangular in shape. In one end of the trough is produced an aperture $a$, and into said aperture is introduced the water-supply pipe $a'$. At the opposite end of the trough is arranged a tank B, of a height equal to the depth of the trough, said tank fitting snugly within the trough, and in the end adjacent to the apertured end of the trough is produced an aperture $b$, through which the water introduced into the trough passes into the tank B.

By means of the tank I am enabled to maintain a very cleanly watering device, as the tank can be quickly and easily removed, cleaned, and replaced.

In order to maintain a definite level of water in the tank, I employ an automatic device adapted to cut off and on the supply of water to the trough. This automatic device comprises a valve mechanism and a float for operating the same. In providing a valve mechanism I employ a plate C, adapted to be secured upon the inner side of the apertured end of the trough, and in the face contiguous to said end is produced a recess $c$, into which the water from the supply-pipe is received. An outlet aperture $c'$ is produced in the plate through which the water passes from the recess $c$ into the trough. A reciprocating valve $c^2$, adapted to cover the aperture $c'$, is pivoted to the plate C, within the recess $c$, the stem $c^3$ of said valve extending through the outlet-aperture into the trough. A guide-strip $c^4$ keeps the valve in proper position, the ends of said strip being secured to the plate, as clearly shown. A float D is pivoted to one side of the trough near the upper edge of the same adjacent to the valve mechanism, said float having a pitman E connected therewith, which pitman is also connected with and operates the valve $c^2$. The float is pivotally connected with the side of the trough by means of the hooks and eyes $d$, and a catch $d'$ is pivoted to the side of the trough adapted to be turned down upon one of the connections to prevent dislocation of the same.

The pitman E is threaded at its upper end, said end passing through an eye $e$, attached to the side of the float adjacent to the valve mechanism, and upon said threaded portion are arranged the nuts $e'$ $e'$, one above, the other below, the eye $e$, by means of which the pitman and float may be adjusted to operate the valve at any particular level. The lower end of the pitman is apertured to receive the stem of the valve. The float itself is of buoyant material; but if preferred a layer of cork may be placed upon the upper surface of the same. In operation the water passes from the supply-pipe through the end of the trough into the recess-plate C, and when the float is down the valve will be open, so that the water may pass into the trough, and after filling the trough to a certain level the water passes into the tank and fills that to a certain point. When the tank and trough are filled to the definite level, the float, which has been rising with the level of the water, gradually cuts off the water-supply until its flow ceases. When the level of the water is lowered, the float falls, opening the valve and permitting enough water to enter to raise the level to the predetermined point, when the valve is again operated to cut the supply off.

A cover F is adapted to be placed over the float-and-valve mechanism and a slat or strip F' placed over the tank, said cover and slat being connected by means of a longitudinal beam F², said beam carrying hooks ƒ at its ends, adapted to engage the staple ƒ', secured to the ends of the trough. By means of the cover, seat, and beam, fastened as described, the various parts are held in place and disturbance of the same prevented. It will also be observed that all the various parts may be quickly and easily removed, cleaned, and replaced.

Having thus described my invention, what I claim as new is—

1. In a watering-trough, the combination, with a trough having an apertured end, of a valve arranged to slide past said aperture, a float hinged to the side of the trough, a rod connected with the valve at its lower end and adjustably connected with the float at its upper end, substantially as shown and described.

2. In a watering-trough, the combination, with the trough having an apertured end, of a recessed plate secured upon the inner side of the trough, covering the said aperture, said plate having an aperture out of alignment with the aperture in the trough, a valve pivoted in the recess of the plate, a rod attached to the said valve, and a float attached to the upper end of the said rod, substantially as shown and described.

JOHN THOMAS THATCHER.

Witnesses:
 EDWARD KRAMER,
 EDGAR O. COSNER.